US008068862B2

(12) United States Patent
Shaheen

(10) Patent No.: US 8,068,862 B2
(45) Date of Patent: Nov. 29, 2011

(54) WIRELESS COMMUNICATION METHOD AND APPARATUS FOR ESTABLISHING A MULTIMEDIA MESSAGE SERVICE OVER A WLAN

(75) Inventor: Kamel M. Shaheen, King of Prussia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1002 days.

(21) Appl. No.: 11/890,897

(22) Filed: Aug. 8, 2007

(65) Prior Publication Data
US 2007/0280190 A1     Dec. 6, 2007

Related U.S. Application Data

(63) Continuation of application No. 11/153,207, filed on Jun. 15, 2005, now Pat. No. 7,260,412.

(60) Provisional application No. 60/592,856, filed on Jul. 30, 2004.

(51) Int. Cl.
*H04W 88/02* (2009.01)
(52) U.S. Cl. .......................................... 455/466; 455/73
(58) Field of Classification Search .................. 455/406, 455/411, 417, 73, 445, 466; 726/22, 54; 375/335, 346, 141; 345/32, 520; 370/329
See application file for complete search history.

(56) References Cited

U.S. PATENT DOCUMENTS

| | | | |
|---|---|---|---|
| 6,947,738 B2 | 9/2005 | Skog et al. | |
| 6,956,832 B1 * | 10/2005 | Muhonen et al. | ............. 370/310 |
| 7,046,998 B2 | 5/2006 | Verma et al. | |
| 7,173,924 B2 * | 2/2007 | Shaheen et al. | ................ 370/338 |
| 7,715,856 B2 * | 5/2010 | Shaheen | ........................ 455/466 |
| 2003/0172114 A1 | 9/2003 | Leung | |
| 2003/0182431 A1 * | 9/2003 | Sturniolo et al. | ............. 709/227 |
| 2004/0039782 A1 * | 2/2004 | Reddy et al. | ................... 709/205 |
| 2004/0066769 A1 | 4/2004 | Ahmavaara et al. | |

(Continued)

FOREIGN PATENT DOCUMENTS

WO          99/66746          12/1999

(Continued)

OTHER PUBLICATIONS

Third Generation Partnership Project; "Technical Specification Group Services and System Aspects; Support of SMS and MMS Over Generic 3GPP IP Access"; Release 7, 3GPP TR 23.804 V1.2.0, Apr. 2005.

(Continued)

*Primary Examiner* — Diane Mizrahi
(74) *Attorney, Agent, or Firm* — Volpe and Koenig, P.C.

(57) ABSTRACT

A wireless communication system for supporting multimedia services (MMS) provided to a user of a wireless transmit/receive unit (WTRU) which communicates with the wireless communication system. The wireless communication system includes a third generation partnership program (3GPP) universal mobile telecommunications system (UMTS), a wireless local area network (WLAN) and an MMS server. The MMS server stores at least one MMS message for the WTRU in a memory until the WTRU retrieves the message. The 3GPP UMTS includes an internet protocol short message gateway (IP-SM-GW) having a short message service (SMS) proxy. The WTRU is registered with the SMS proxy to establish SMS connectivity, and is also registered with the MMS server to establish MMS connectivity. The WTRU is notified when the MMS server receives an MMS message for the WTRU. The WTRU then retrieves the MMS message from the memory of the MMS server.

9 Claims, 4 Drawing Sheets

U.S. PATENT DOCUMENTS

| | | | |
|---|---|---|---|
| 2004/0132427 | A1 | 7/2004 | Lee et al. |
| 2005/0002407 | A1 | 1/2005 | Shaheen et al. |
| 2005/0226174 | A1 | 10/2005 | Kiss |
| 2007/0258427 | A1* | 11/2007 | Shaheen et al. ............. 370/338 |
| 2007/0280190 | A1* | 12/2007 | Shaheen ..................... 370/338 |

FOREIGN PATENT DOCUMENTS

| | | |
|---|---|---|
| WO | 2004/036770 | 4/2004 |
| WO | 2004/099919 | 11/2004 |

OTHER PUBLICATIONS

Third Generation Partnership Project, "Technical Specification Group Services and System Aspects; 3GPP System to Wireless Local Area Network (WLAN) Interworking; System Description"; 3GPP TS 23.234 V6.0.0 (Release 6), Mar. 2004.

$3^{rd}$ Generation Partnership Project; Technical Specification Group Services and System Aspects; 3GPP System To Wireless Local Area Network (WLAN) Interworking; System Description (Release 6), 3GPP TS 23.234 V6.4.0 (Mar. 2005).

$3^{rd}$ Generation Partnership Project; Technical Specification Group Services and System Aspects; 3GPP System To Wireless Local Area Network (WLAN) Interworking; System Description (Release 6), 3GPP TS 23.234 V6.0.0 (Mar. 2003).

$3^{rd}$ Generation Partnership Project; Technical Specification Group GSM/EDGE Radio Access Network; Generic Access To The AGb Interface; Stage 2 (Release 6), 3GPP TS 43.318 V6.0.0 (Jan. 2005).

Unlicensed Mobile Access (UMA); Architecture (Stage 2); UMA Architecture (Stage 2) R1.0.4 (May 2, 2005).

* cited by examiner

WIRELESS COMMUNICATION METHOD AND APPARATUS FOR ESTABLISHING A MULTIMEDIA MESSAGE SERVICE OVER A WLAN

CROSS REFERENCE TO RELATED APPLICATION(S)

This application is a continuation of U.S. patent application Ser. No. 11/153,207 filed on Jun. 15, 2005, which claims the benefit of U.S. Provisional Application No. 60/592,856, filed Jul. 30, 2004, which is incorporated by reference as if fully set forth herein.

FIELD OF INVENTION

The present invention is related to a wireless communication system including at least one wireless transmit/receive unit (WTRU), a Third Generation Partnership Project (3GPP) universal mobile telecommunications system (UMTS), a multimedia service (MMS) server and a wireless local area network (WLAN). More particularly, the present invention enables the WTRU to register with the 3GPP UMTS and the MMS server such that the WTRU may retrieve MMS messages from the MMS server over the WLAN.

BACKGROUND

The implementation of WLANs in wireless communication systems has expanded dramatically to replace wired computer networks. Using a WLAN, an end user may gain benefits such as flexibility and freedom of movement. The WLANs provide faster bit rates and are cheaper because they operate on an unlicensed band. Additionally, the current WLAN architecture lacks the ability and mechanisms to page the WTRU to ensure its presence for the delivery of Internet-based services.

Existing 3GPP UMTS systems provide WTRU users with access to Internet-based services such as MMS. MMS is a store-and-forward method of transmitting graphics, video clips, sound files and short text messages, (i.e., emails), over wireless networks. It is desirable to implement a wireless communication system which provides 3GPP-based services using a WLAN interworking with a 3GPP system.

SUMMARY

The present invention is implemented in a wireless communication system for supporting MMS over a 3GPP UMTS interworking with a WLAN. The 3GPP UMTS includes a short message service-service center (SMS-SC), an SMS-gateway mobile switching center (SMS-GMSC)/SMS-interworking mobile switching center (MSC) (SMS-IWMSC), a home location register (HLR)/home subscriber server (HSS), an authentication, authorization, and accounting (AAA) server, an IP short message gateway (IP-SM-GW) having an SMS proxy and access to an IP address database, and a packet data gateway (PDG). The 3GPP UMTS and WLAN access an MMS server via the Internet.

A WTRU establishes an SMS tunnel connection between the 3GPP UMTS and the WLAN via the IP-SM-GW and the packet data gateway (PDG). The SMS tunnel connection is established to support MMS over the WLAN. The WTRU registers with the SMS Proxy within the IP-SM-GW to establish SMS connectivity. The WTRU also registers with the MMS server and provides its mobile station international ISDN number (MSISDN), (i.e., telephone number). When an MMS message is received by the MMS server, the MMS server sends an SMS message to the WTRU via the WLAN using its MSISDN. The MMS server stores the MMS message in a memory until the WTRU retrieves it. The SMS message informs the user of the WTRU that an MMS message has been received. The user of the WTRU accesses an associated MMS account and retrieves the MMS message.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment.

Figure 1:
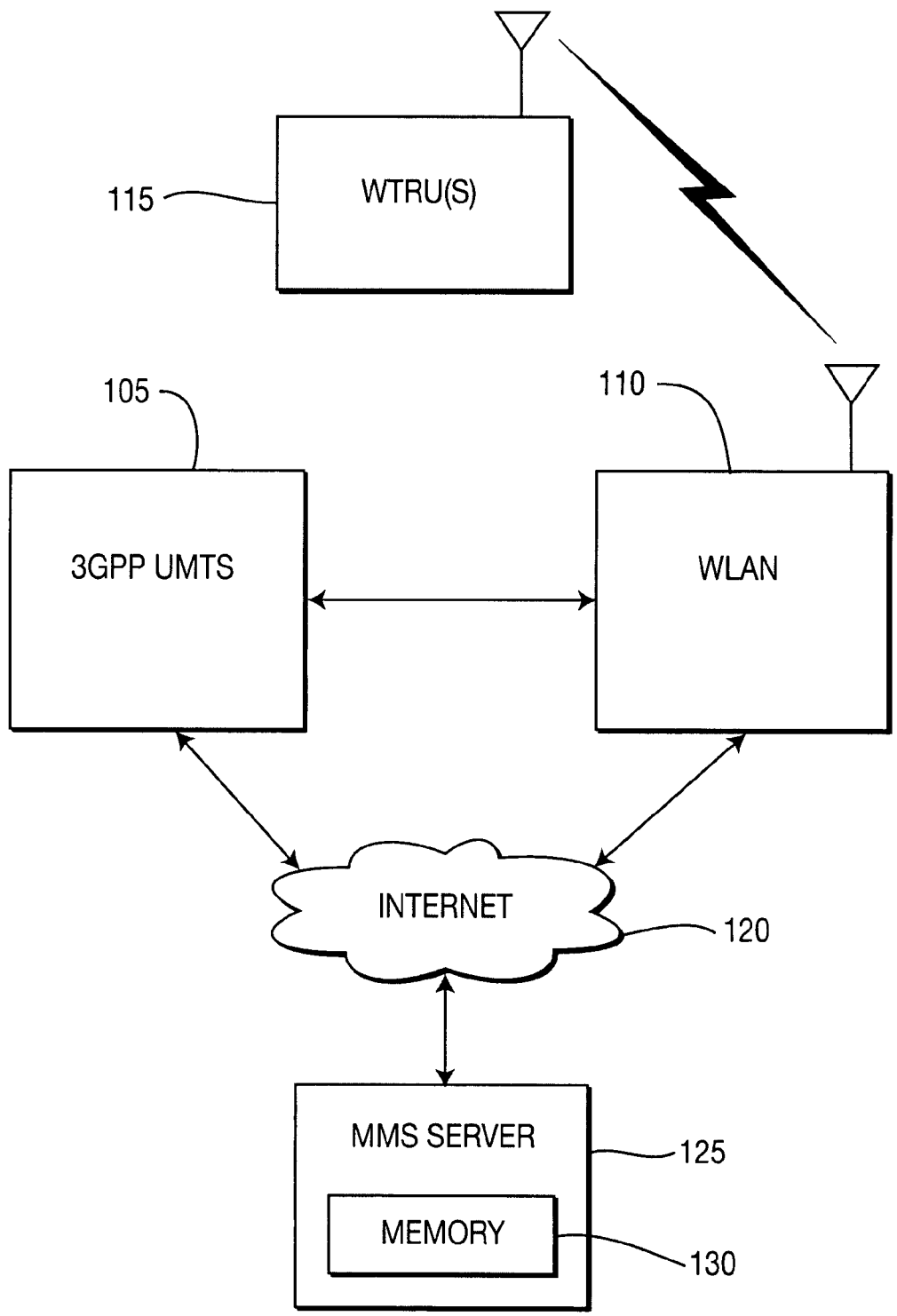
FIG. 1 is a block diagram of a wireless communication system including a 3GPP UMTS interworking with a WLAN in accordance with the present invention.

The present invention is implemented in a wireless communication system 100 for supporting MMS, as shown in FIG. 1. The wireless communication system 100 includes a 3GPP UMTS 105, a WLAN 110 and at least one WTRU 115 which establishes MMS connectivity by registering with an MMS server 125 over the Internet 120 in accordance with the present invention. The MMS server 125 includes a memory 130 for storing MMS messages accessible by the WTRU 115.

Figure 2:
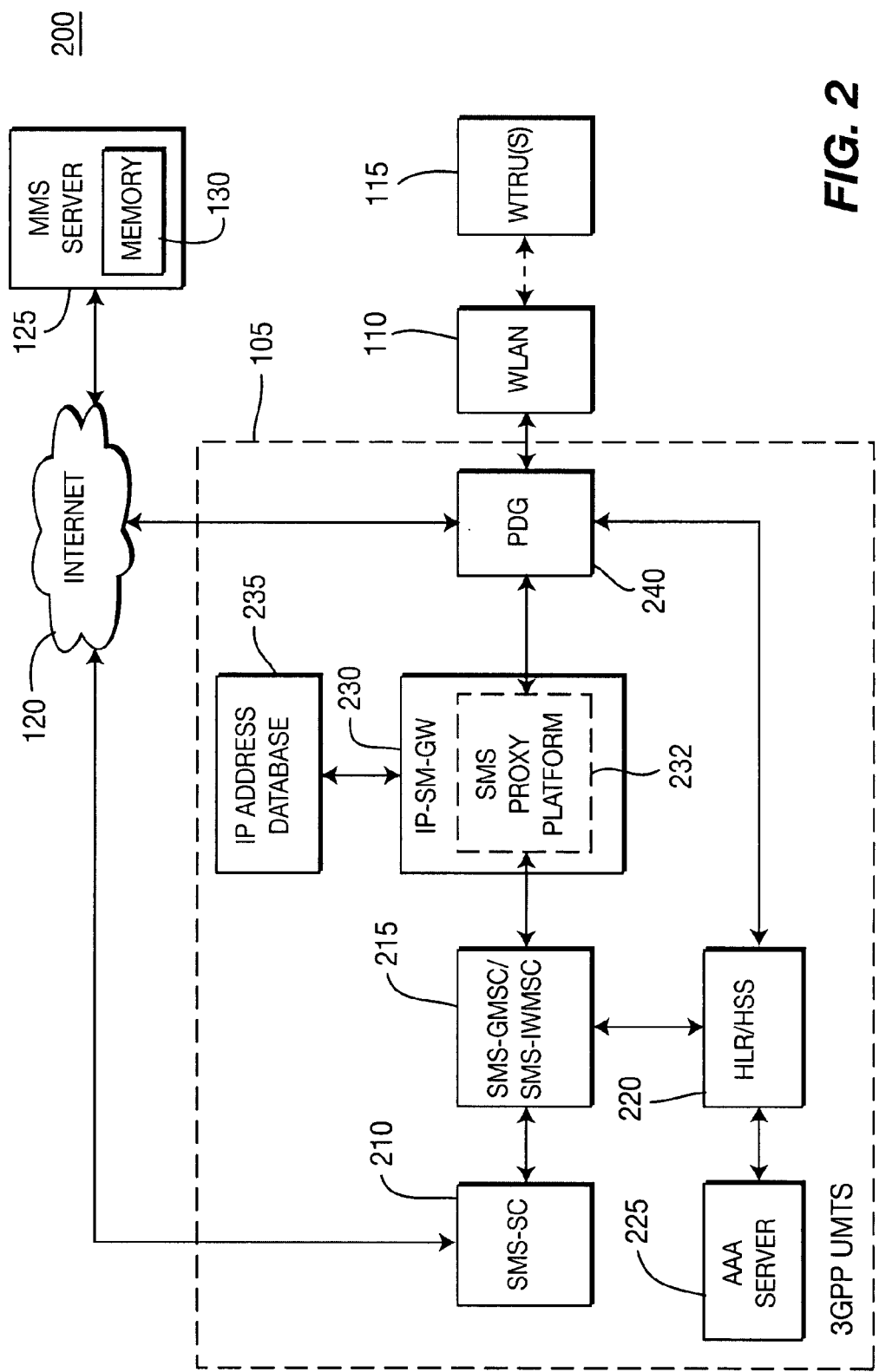
FIG. 2 is a detailed block diagram of the wireless communication system of FIG. 1.

FIG. 2 is a block diagram of a wireless communication system 200 which supports MMS in accordance with the present invention. The system 200 includes a 3GPP UMTS 105 including an SMS-SC 210 which provides multimedia services via the Internet 120, an SMS-GMSC/SMS-IWMSC 215, an HLR/HSS 220, an AAA server 225, an IP-SM-GW 230 having an SMS proxy platform 232 and access to an IP address database 235, and a PDG 240.

The SMS-GMSC/SMS-IWMSC 215 has two functions: an SMS-GMSC function and an SMS-IWMSC function. The SMS-GMSC function receives a short message and interrogates the HLR/HSS 220 for routing information. The SMS-IWMSC function forwards short messages received from the WTRU 115 to the SMS-SC 210 and the MMS server 125 via the Internet 120.

The WLAN 110 provides MMS to at least one WTRU 115. The HLR/HSS 220 communicates with the AAA server 225 which stores information relating to which WTRUs can access the WLAN 110, what services the WTRUs 115 are permitted to use, and accounting records for each WTRU 115. Further details of HLR/HSS/AAA operation may be found in co-pending application Ser. No. 11/112,503 entitled "REPORTING TERMINAL CAPABILITIES FOR SUP- PORTING SHORT MESSAGE SERVICE," which was filed on Apr. 22, 2005, and is incorporated by reference as if fully set forth herein.

Figure 3:
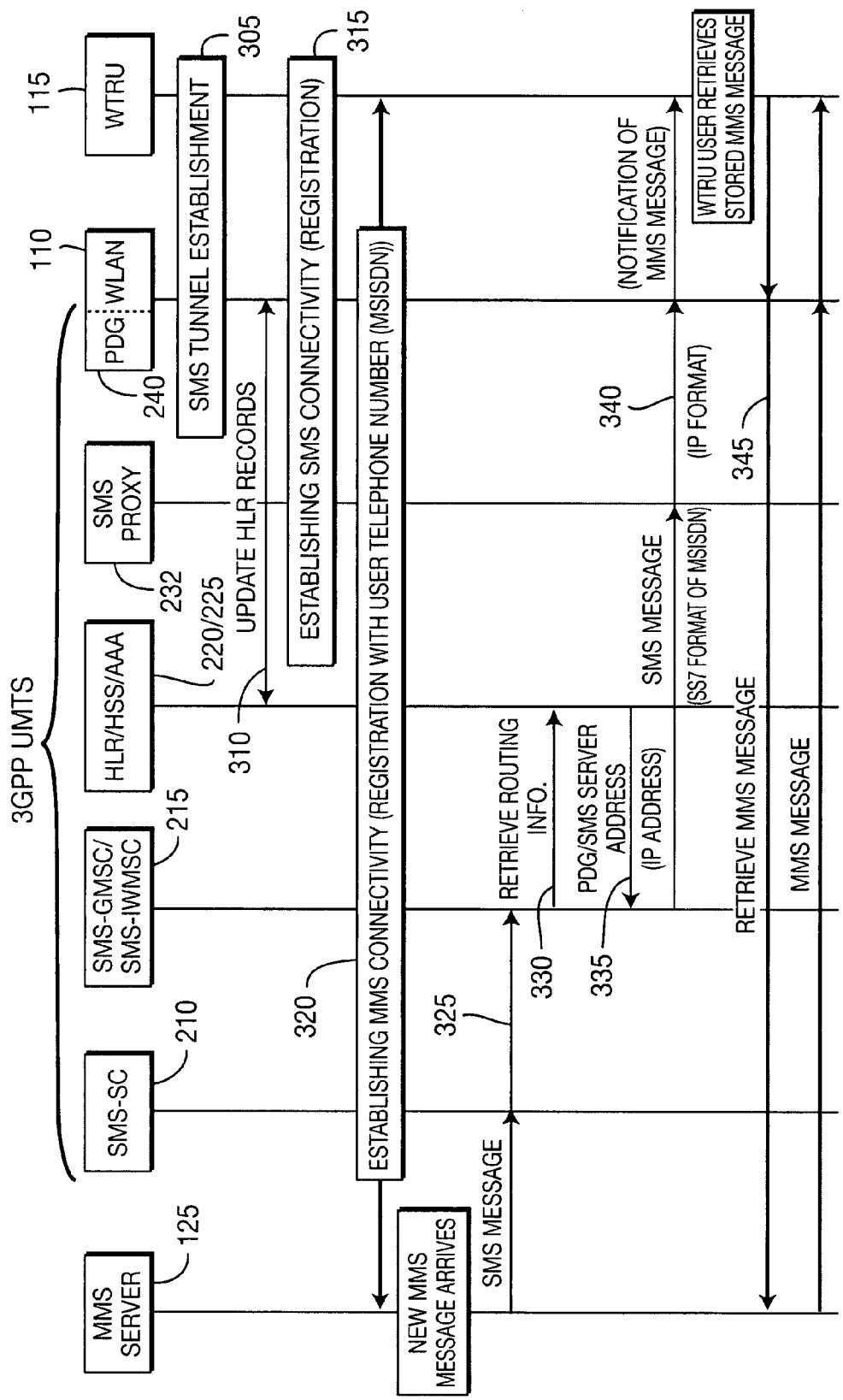
FIG. 3 is a flow diagram of a method for establishing MMS over a WLAN by providing a WTRU user's telephone number when registering with a MMS server in accordance with one embodiment of the present invention.

FIG. 3 is a flow diagram of a process including method steps for establishing MMS over a WLAN 110 by a user providing the telephone number of the WTRU 115 when registering with the MMS server 125 in accordance with one embodiment of the present invention. In step 305, an SMS tunnel connection is established through the WTRU 115, the WLAN 110 and the PDG 240. In step 310, the records of the HLR 220 are updated. The HLR 220 has access to information needed to locate the WTRU 115 and how to route the incoming MMS service. When the WTRU 115 is registered to receive its SMS and MMS services via the WLAN 110, the HLR/HSS 220 returns the address of the IP-SM-GW 230 to the SMS-GMSC/SMS-IWMSC 215 in response to receiving a query from the SMS-GMSC/SMS-IWMSC 215 regarding the location of the WTRU 115 specified by the MSISDN included in an SMS message sent by the MMS server 125 to the SMS-SC 210 via the Internet 120.

In step 315, the WTRU 115 is registered with the SMS proxy 232 to establish SMS connectivity. In step 320, the WTRU is registered with the MMS server 125 to establish MMS connectivity. The user of the WTRU 115 may provide a telephone number, (i.e., MSISDN), associated with the WTRU 115 to the MMS server 125. When a new MMS message arrives at the MMS server 125, the MMS server 125 sends an SMS message to the WTRU 115 alerting the user of the WTRU 115 that there is an MMS message awaiting retrieval at the MMS server 125 (steps 325 and 340). The SMS message is routed by retrieving routing information, (i.e., the PDG/SMS server address (IP address) associated with the WTRU 115), from the HLR/HSS 220 and/or the AAA server 225 (steps 330, 335). In step 345, the WTRU 115 retrieves the MMS message from the memory 130 of the MMS server 125.

Figure 4:
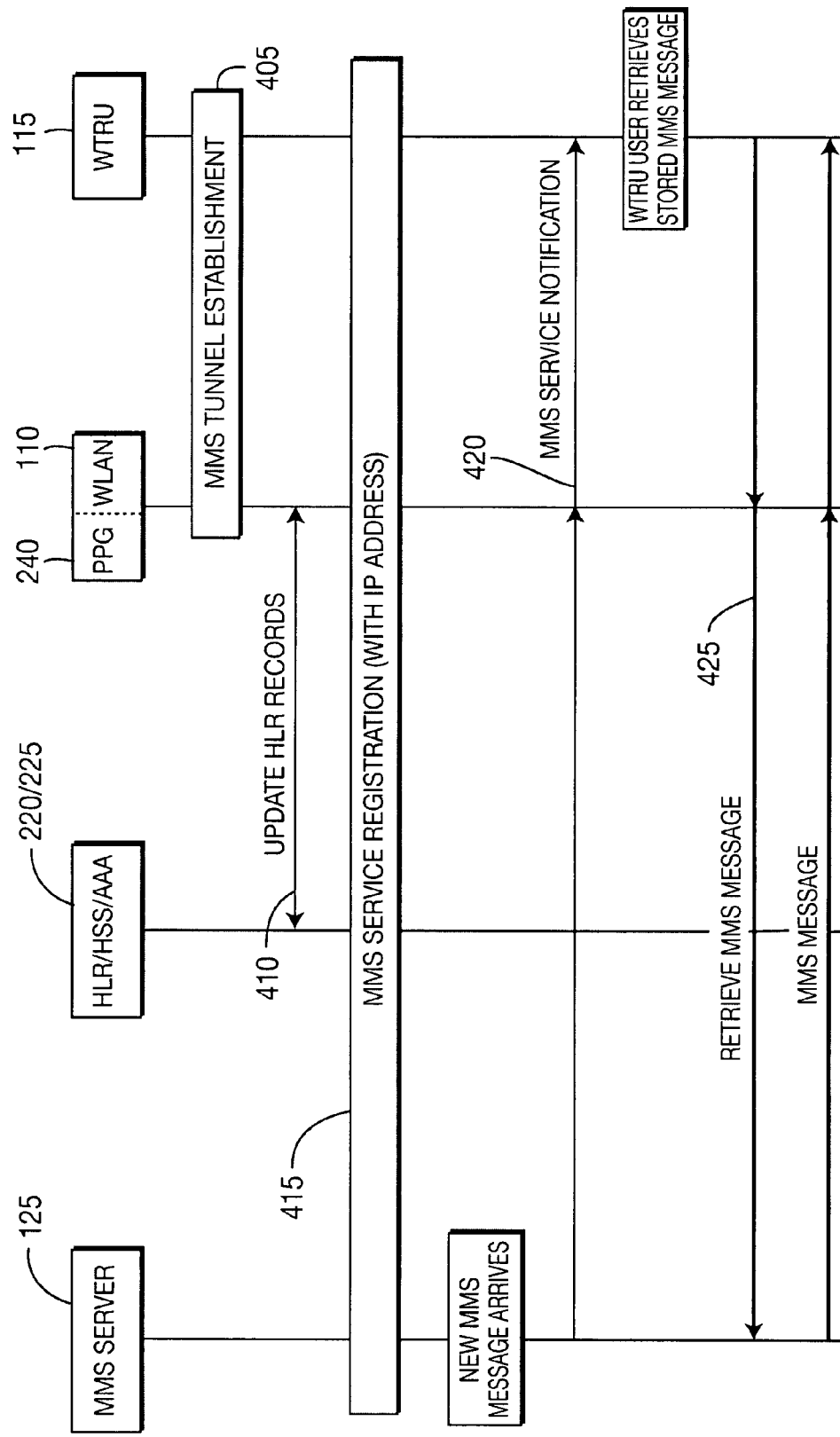
FIG. 4 is a flow diagram of a method for establishing MMS over a WLAN by providing a WTRU user's IP address when registering with an MMS server in accordance with another embodiment of the present invention.

FIG. 4 is a flow diagram of an IP process including method steps for establishing MMS over a WLAN 110 by providing a WTRU user's IP address when registering with the MMS server 125 in accordance with another embodiment of the present invention. In step 405, an MMS tunnel connection is established between the WTRU 115 and the WLAN 110. In step 410, the records of the HLR 220 are updated in a similar fashion as described with respect to step 315. In step 415, the WTRU 115 is registered with the MMS server 125 using an IP address associated with the WTRU 115. In step 420, a new MMS service is established and the user of the WTRU 115 is alerted that there is an MMS message awaiting retrieval at the MMS server 125 (step 420). In step 425, the WTRU 115 retrieves the MMS message from the memory 130 of the MMS server 125.

If the WTRU 115 remains idle for an extended period of time, the connection established between the WTRU 115 and the WLAN 110 may be terminated.

The WTRU 115 periodically registers with the SMS proxy 232 and/or the MMS server 125 to maintain the connection between the WLAN 110 and the MMS server 125.

The user of the WTRU 115 may initiate a service termination request to terminate any pending activities over the WLAN 110.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for use in a wireless transmit/receive unit (WTRU), the method comprising:
    the WTRU establishing a connection to a wireless local area network (WLAN);
    the WTRU registering to receive a multimedia messaging service (MMS);
    the WTRU receiving a notification message via the WLAN, wherein the notification message indicates that there is an MMS message awaiting retrieval; and
    the WTRU retrieving the MMS message via the WLAN.

2. The method of claim 1, wherein the notification message is a Short Message Service (SMS) message.

3. The method of claim 1, further comprising:
    the WTRU establishing a tunnel to a Packet Data Gateway (PDG) via the WLAN;
    wherein the SMS message and the MMS message are received via the tunnel to the PDG.

4. The method of claim 1, wherein the registering to receive the MMS is performed via the WLAN.

5. The method of claim 1, wherein the registering to receive the MMS includes registering with an Internet Protocol Short Message Gateway (IP-SM-GW).

6. The method of claim 1, wherein the registering to receive the MMS includes registering with the MMS server.

7. The method of claim 6, wherein the registering with the MMS server includes transmitting a Mobile Station International ISDN Number (MSISDN) of the WTRU to the MMS server.

8. The method of claim 6, wherein the registering with the MMS server includes transmitting an Internet Protocol (IP) address of the WTRU to the MMS server.

9. The method of claim 1, wherein the WTRU retrieving the MMS message via the WLAN includes the WTRU retrieving the MMS message from an MMS server.

* * * * *

UNITED STATES PATENT AND TRADEMARK OFFICE
CERTIFICATE OF CORRECTION

PATENT NO.         : 8,068,862 B2                                              Page 1 of 1
APPLICATION NO.    : 11/890897
DATED              : November 29, 2011
INVENTOR(S)        : Kamel M. Shaheen It is certified that error appears in the above-identified patent and that said Letters Patent is hereby corrected as shown below:

ON THE TITLE PAGE

At Section (56) OTHER PUBLICATIONS, page 2, right column, after "V6.4.0 (Mar. 2005)." delete "3rd Generation Partnership Project, Technical Specification Group Services and System Aspects; 3GPP System to Wireless Local Area Network (WLAN) Interworking; System Description (Release 6), 3GPP TS 23.234 V6.0.0 (Mar. 2003)."

At Section (56) OTHER PUBLICATIONS, page 2, right column, before "*cited by examiner" insert:

--3rd Generation Partnership Project; Technical Specification Group Services and System Aspects; 3GPP System To Wireless Local Area Network (WLAN) Interworking; System Description (Release 6), 3GPP TS 23.234 V6.1.0 (June 2004).

Third Generation Partnership Project, "Technical Specification Group Terminals; Technical realization of the Short Message Service (SMS); (Release 6)," 3GPP TS 23.040 V6.4.0 (June 2004).

Third Generation Partnership Project, "Technical Specification Group Terminals; Technical realization of the Short Message Service (SMS); (Release 6)," 3GPP TS 23.040 V6.5.0 (September 2004).--

Signed and Sealed this
Twenty-eighth Day of August, 2012

David J. Kappos
*Director of the United States Patent and Trademark Office*